United States Patent Office 3,816,596
Patented June 11, 1974

3,816,596
METHOD OF MAKING A URANIUM-ANTIMONY OXIDE CATALYST
Kenneth V. Wise, Ballwin, Mo., assignor to Monsanto Company, St. Louis, Mo.
No Drawing. Filed Oct. 4, 1971, Ser. No. 186,535
Int. Cl. C01g 43/00
U.S. Cl. 423—253                              3 Claims

ABSTRACT OF THE DISCLOSURE

An improved oxidation and/or ammoxidation catalyst based on antimony, uranium and oxygen is prepared by forming a solution of solubilized antimony oxides and uranium salts or oxides, evaporating the solution to dryness to form a solid residue, drying the solid residue and heating the dried solid residue at a temperature of from 750° C. to 1000° C. A preferred embodiment produces a catalyst consisting essentially of a compound represented by the formula $USb_3O_{10}$. The catalyst is useful in oxidizing and ammoxidizing olefins.

BACKGROUND OF THE INVENTION

This invention relates to an improved oxidation and/or ammoxidation catalyst system containing the elements antimony and uranium and to an improved method for preparing such catalyst system.

It is well known that olefins can be oxidized to oxygenated hydrocarbons such as unsaturated aldehydes and acids, for example, acrolein and methacrolein, acrylic and methacrylic acid. It is also well known that olefins can be ammoxidized to unsaturated nitriles such as acrylonitrile and methacrylonitrile. The value of such oxygenated hydrocarbons and unsaturated nitriles is generally well recognized with acrylonitrile being among the most valuable monomers available to the polymer industry for producing useful polymeric products.

Various catalytic processes are known for the oxidation and/or ammoxidation of olefins. Such processes commonly react and olefin or an olefin-ammonia mixture with oxygen in the vapor phase in the presence of a catalyst. For the production of acrolein and acrylonitrile, propylene is the generally used olefin reactant and for the production of methacrolein and methacrylonitrile, isobutylene is the generally used olefin reactant.

A catalyst system composed of the oxides of antimony and uranium and the oxidation and ammoxidation of olefins using such catalyst has been described in United States Letters Patent Nos. 3,198,750 and 3,308,151. These patents describe preparation of the catalyst by precipitation wherein the oxides of the elements are contained in a slurry which is filtered to remove soluble salts and recover the catalytic components as the filter cake.

In the catalytic oxidation and/or ammoxidation of olefins, the commercial utility of a catalyst system is highly dependent upon the cost of the system, the conversion of the olefin and the yield of the desired product. In many cases a reduction in the cost of a catalyst system in the order of a few pennies per pound or a 1% increase in the yield of a desired product represents a tremendous commercial economical savings. Accordingly, research efforts are continuously being made to define new or improved methods of making such catalyst systems to reduce the cost and/or to upgrade the activity and selectivity of such catalyst systems in particular processes.

SUMMARY

This invention is directed to improving the activity and selectivity of a catalyst system containing the elements antimony and uranium for the catalytic oxidation and/or ammoxidation of olefins and is particularly directed to an improved method of making such catalyst system.

Accordingly, typical objects of this invention are to provide: (1) an improved oxidation and/or ammoxidation catalyst system containing oxygen, antimony and uranium, (2) an improved process for the preparation of a catalyst system containing oxygen, antimony and uranium, (3) an improved oxidation and/or ammoxidation catalyst system containing a substantially intermolecuar compound of oxygen, antimony and uranium, and (4) an improved olefin conversion process.

Other objects, aspects and advantages of this invention will become apparent to those skilled in the art upon further study of this disclosure and the appended claims.

In accordance with this invention, the catalytic activity and selectivity of a catalyst system containing oxygen, antimony and uranium are greatly enhanced by preparing a solution having antimony oxides and uranium salts or oxides dissolved therein, evaporating the solution to form a solid residue, drying the solid residue and heating the dried solid residue at selected elevated temperatures to form the active catalytic components.

The catalyst of this invention is based primarily on the elements antimony and uranium in combination with oxygen, however, it may include other additional elements, such as phosphorous, as well as oxides or antimonates of other materials, such as nickel, vanadium, barium, silicon and the like.

The antimony:uranium atomic ratio of the catalyst effective in the conversion of unsaturated hydrocarbons in accordance with this invention can range from about 1:1 to about 99:1, preferably from about 1:1 to about 20:1 and more preferably at a ratio of about 3:1.

Antimony metal may be used as a starting material which is converted to the oxide by hot nitric acid. The antimony oxide is then solubilized by adding hydrochloric acid to the mixture. If antimony oxide is used as the starting material it may be dissolved in a mixture of nitric and hydrochloric acids. Uranium oxides or salts of uranium may be used as starting material.

After the antimony oxide and uranium oxide or salt are thoroughly dissolved to form a true solution, the solution is evaporated to dryness to form a solid residue of the catalytic components. The heating of the solution to cause evaporation can be conducted at a temperature of from about 30° C. to about 90° C. A temperature of about 110° F. has been found to be satisfactory. The solid residue may be obtained by adding ammonium hydroxide to the solution instead of heating the solution.

After forming the solid residue from the solution of antimony oxide and uranium oxide or salt, the solid residue is dried. Drying of the solid residue can be obtained at a temperature of from about 100° C. to about 180° C. A suitable drying temperature is about 110 C. However, the drying can be obtained at higher temperatures such as up to about 650° C. The time required for drying the solid residue can range from an hour up to about 64 hours. Obviously, the drying temperature selected will dicate the required drying time with the lower temperatures requiring the longer time. Also, the solid residue may be dried at different temperatures, for example at 110° C. for from 2 to 64 hours and then at a temperature of from about 250° C. to about 650° C. for from 2 to 24 hours.

After the solid residue is dried, it is further heated at an elevated temperature to otbain the active catalytic form of the elements. This calcination of the catalyst is conducted at a temperature in the range of from about 550° C. to about 1150° C. The time for calcination can vary and depends upon the temperatures employed. Generally, a time period of 2 to 24 hours at the designated temperatures is sufficient. The calcination may be conducted in the presence of oxygen (air); however, the catalyst may also be made active by calcining it in the absence of oxygen, such as in a nitrogen atmosphere.

It has recently been determined that the most active combination of antimony, uranium and oxygen for converting an olefin and ammonia to nitrile is a compound having a nominal formula of $USb_3O_{10}$. Generally speaking and heretofore, commercially available antimony and uranium oxide ammoxidation catalysts are composed of several detectable compounds, represented by the nominal formulas $Sb_2O_5$, $Sb_2O_4$, $U_3O_8$, $USb_3O_{10}$ and $U_3Sb_3O_{15}$, with the most active compound, $USb_3O_{10}$, comprising only about 50 weight percent of the total catalyst.

A highly preferred embodiment of this invention is the preparation of a catalyst which consists essentially of an intermolecular compound or a single component having a nominal formula of $USb_3O_{10}$. Accordingly, an atomic ratio of 3:1 antimony:uranium is preferred at this time.

When calcining a dried solid residue formed from a 3:1 ratio of anitmony:uranium, it has been determined that the $USb_3O_{10}$ combination is formed over a rather narrow temperature range. Below a temperature of about 750° C. such compound is not detected and above about 1000° C. such compound is transformed into less active compounds. However, within this temperature range the catalyst contains 98 to 100 weight percent of $USb_3O_{10}$.

The improved catalyst of this invention exhibits exceptional utility in the conversion of olefins with or without the presence of ammonia. The olefins employed as reactants for conversion by the catalyst of this invention may be open-chain as well as cyclic and include, for example, propylene, butene-1, butene-2, isobutene, pentene-1, pentene-2, 3-methyl butene-1, 2-methyl butene-2, hexene-1, hexene-2, 4-methyl pentene-1, 3,3 dimethyl butene-1, 4-methyl pentene-2, octene-1, cyclopentene, cyclohexene, and the like. Particularly, when the catalyst of this invention is used as merely an oxidation catalyst, it is particularly adapted to the conversion of propylene to acrolein and isobutylene to methacrolein. Of course, mixtures of olefins may be employed and mixtures of olefins with other hydrocarbons are applicable to the process of this invention. When the catalyst of this invention is to be used as an ammoxidation catalyst, the olefins as aforestated are applicable. However, the catalyst of this invention is particularly adapted to the conversion of propylene with ammonia and oxygen to acrylonitrile at 250° C. to 650° C.

The molar ratio of oxygen to the olefin in the feed will generally be in the range of 0.5:1 to 4:1 with a preferred ratio being 1:1 to 3:1. The molar ratio of ammonia to olefin in the feed will generally be in the range of 0.5:1 to 5:1 and preferably slightly over the stoichiometric ratio of 1:1 ammonia:olefin will be employed.

While ammonia is most generally employed as the nitrogen providing compound, other nitrogen containing materials may be employed which decompose to produce reactive nitrogen under the reaction conditions. Any source of oxygen, pure or in admixture with inerts, may be employed in the process of this invention. Air is a satisfactory source of oxygen for use in this invention.

The improved catalyst system of this invention can be further improved by washing the dried solid residue with water, filtering the solid residue from the wash, redrying the recovered solid residue and then heating the dried solid residue at elevated temperatures to form the active components.

The catalyst system of this invention can be advantageously employed for synthesizing styrene from ethylbenzene and oxygen, butadiene from butenes and oxygen, acrolein or methacrolein from propylene or isobutylene and oxygen, acrylonitrile or methacrylonitrile from propylene or isobutylene, ammonia and oxygen, isoprene from 2-methyl butene-2 and oxygen, and 2-cyano-1,3-butadiene from 2-methyl butene-2 or isoprene, ammonia and oxygen.

Suitable salts of uranium useful as the starting material in this invention are, for example, uranium tetrachloride, tetrabromide or tetraiodide, uranium pentachloride, uranium hexafluoride, uranyl nitrate, uranyl acetate, uranyl sulfate, uranyl chloride and uranyl bromide. Oxides of uranium may be used as the starting material.

DESCRIPTION OF PREFERRED EMBODIMENTS

The following Examples are presented as illustrative of the invention and, as such, are not intended to be restrictive upon the specific materials, quantities and operating variables specifically set forth therein.

EXAMPLE I

A catalyst system composed of antimony and uranium having an Sb:U atomic ratio of 3:1 is prepared as follows: 160 grams of Sb metal is added to 600 ml. of hot 70% nitric acid. After evolution of nitrogen oxides cease, 600 ml. of 37% hydrochloric acid is added and the slurry is heated and stirred until the $Sb_2O_5$ is in solution. A second solution is prepared by dissolving 121.5 grams of $U_3O_8$ in 250 ml. of hot 70% $HNO_3$. The two solutions are mixed. The resulting solution is heated until a suspension is formed and the heating is continued until the suspension is concentrated and thickens. The concentrated suspension is dried at 110° C. for 16 hours and then calcined in air at 875° C. for 16 hours.

EXAMPLE II

Example I is repeated except that after the suspension is dried at 110° C. for 16 hours it is washed repeatedly with water until the washings read neutral to litmus paper. Each washing comprised pouring water onto the catalyst (250 ml. of water per 60 grams of catalyst), stirring the mixture, letting the mixture set for a minimum of 5 minutes, and decanting the liquid. The catalyst is then calcined in air at 875° C. for 16 hours.

EXAMPLE III

Example I is repeated except that after the suspension is dried at 110° C. for 16 hours, water is added to the catalyst (100 ml. of water per 60 grams of catalyst) and the mixture is stirred. Then 28% $NH_4OH$ is added to the mixture (30 ml. of 28% $NH_4OH$ per 60 grams of catalyst) and the mixture is stirred. The pH of the mixture is 4. After decanting a yellow colored liquid, the catalyst is calcined in air at 875° C. for 16 hours.

EXAMPLE IV

A catalyst system composed of antimony and uranium having an Sb:U atomic ratio of 3:1 is prepared as follows: 30 grams of Sb metal is added to 115 ml. of hot 70% nitric acid. After evolution of nitrogen oxides cease, 115 ml. of 37% hydrochloric acid is added and the slurry is heated and stirred until the $Sb_2O_5$ is in solution. A second solution is prepared by dissolving 40.8 grams of $UO_2(NO_3)_2 \cdot 6H_2O$ in 45 ml. of 70% $NHO_3$. The two solutions are mixed and then added to 450 ml. of 28% ammonia hydroxide. The pH of the mixture is 5. The resulting slurry is filtered and 250 ml. of water is added to the filter cake. After standing 10 minutes the slurry is filtered. The filter cake is dried at 110° C. and then calcined in air at 875° C.

EXAMPLE V

A catalyst system composed of antimony and uranium having an Sb:U atomic ratio of 3:1 is prepared as follows: 30 grams of Sb metal is added to 115 ml. of hot 70% nitric acid. After evolution of nitrogen oxides cease, 115 ml. of 37% hydrochloric acid is added and the slurry is heated and stirred until the $Sb_2O_5$ is in solution. A second solution is prepared by dissolving 40.8 grams of $$UO_2(NO_3)_2 \cdot 6H_2O$$

in 45 ml. of 70% $NHO_3$. The two solutions are mixed and the pH is adjusted to 6 by adding 410 ml. of 28% ammonia hydroxide. The resulting slurry is filtered and the filter cake is washed 3 times with 120 ml. of portions of water. The filter cake is dried at 110° C. and then calcined in air at 875° C.

EXAMPLE VI

A catalyst system composed of antimony and uranium having an Sb:U atomic ratio of 3:1 is prepared as follows: 30 grams of Sb metal is added to 115 ml. of hot 70% nitric acid. After evolution of nitrogen oxides cease, 115 ml. of 37% hydrochloric acid is added and the slurry is heated and stirred until the $Sb_2O_5$ is in solution. A second solution is prepared by dissolving 40.8 grams of $$UO_2(NO_3)_2 \cdot 6H_2O$$

in 45 ml. of 70% $HNO_3$. The two solutions are mixed and the pH is adjusted to 8 by adding 400 ml. of 28% ammonia hydroxide. The resulting slurry is filtered and the filter cake is dried at 110° C. and then at 180° C. for 24 hours. The catalyst is calcined in air at 430° C. for 64 hours and then at 875° C. for 16 hours.

EXAMPLE VII

A catalyst system composed of antimony and uranium having an Sb:U atomic ratio of 3:1 is prepared as follows: 90 grams of Sb metal is added to 345 ml. of hot 70% nitric acid. After evolution of nitrogen oxides cease, 345 ml. of 37% hydrochloric acid is added and the slurry is heated and stirred until the $Sb_2O_5$ is in solution. A second solution is prepared by dissolving 122.4 grams of $UO_2(NO_3)_2 \cdot 6H_2O$ in 135 ml. of 70% $HNO_3$. The two solutions are mixed and the pH is adjusted to 8 by adding 1340 ml. of 28% ammonia hydroxide. The resulting slurry is filtered and the filter cake is washed 3 times with 500 ml. portions of water. The filter cake is dried at 110° C. and then calcined in air at 875° C.

EXAMPLE VIII

A catalyst system composed of antimony and uranium having an Sb:U atomic ratio of 3:1 is prepared as follows: 90 grams of Sb metal is added to 345 ml. of hot 70% nitric acid. After evolution of nitrogen oxides cease, 345 ml. of 37% hydrochloric acid is added and the slurry is heated and stirred until the $Sb_2O_5$ is in solution. A second solution is prepared by dissolving 122.4 grams of $UO_2(NO_3)_2 \cdot 6H_2O$ in 135 ml. of 70% $HNO_3$. The two solutions are mixed and the pH is adjusted to 8 by adding 1280 ml. of 28% $NH_4OH$. The resulting slurry is filtered and the filter cake is washed 3 times with 500 ml. portions of water. The filter cake is dried at 110° C. A portion of the catalyst is calcined in air at 875° C. for 16 hours. Another portion of the catalyst is calcined in nitrogen at 875° C.

EXAMPLE IX

A catalyst system composed of antimony and uranium having an Sb:U atomic ratio of 3:1 is prepared as follows: 150 grams of Sb metal is added to 575 ml. of hot 70% $HNO_3$. After evolution of nitrogen oxides the slurry is filtered and the filter cake antimony oxide is washed with water until the filtrate is neutral. The antimony oxide is then dissolved in 575 ml. of hot 37% HCl. A second solution is prepared by dissolving 204 grams of $$UO_2(NO_3)_2 \cdot 6H_2O$$

in 50 ml. of hot 37% HCl. The two solutions are mixed and the pH adjusted to 7 by adding 1680 ml. of 20% $NH_4OH$. The resulting slurry is filtered and the filter cake is broken up and stirred for 10 minutes in 2 liters of water. The slurry is then filtered and the filter cake is dried at 110° C. A portion of the catalyst is calcined in air at 850° C. for 16 hours. Another portion of the catalyst is calcined in nitrogen at 850° C. for 16 hours.

As used in the examples, the following terms have the following definitions:

Percent propylene ($C_3H_6$) converted $$= \frac{\text{mols } C_3H_6 \text{ in feed} - \text{mols } C_3H_6 \text{ in effluent}}{\text{mols } C_3H_6 \text{ in feed}} \times 100$$

Percent selectivity to acrylonitrile (AN)

$$= \frac{\text{mols AN in effluent}}{\text{mols } C_3H_6 \text{ in feed} - \text{mols } C_3H_6 \text{ in effluent}} \times 100$$

Percent propylene to acrylonitrile $$= \frac{\text{mols AN formed}}{\text{mols } C_3H_6 \text{ in feed}} \times 100$$

Percent selectivity to acrolein (ACR)

$$= \frac{\text{mols ACR in effluent}}{\text{mols } C_3H_6 \text{ in feed} - \text{mols } C_3H_6 \text{ in effluent}} \times 100$$

The apparatus employed in carrying out the runs in this example is a fluidized bed type reactor. The reactor consists of a 14 mm. inside diameter 96% quartz glass tube fitted at the bottom with a fritted disc for supporting a catalyst bed of up to 30 ml. in volume and fitted at the top with another fritted disc to remove entrained catalyst from the reactor effluent. A thermowell of 4 mm. outside diameter 96% quartz glass extends through the center of the catalyst bed to the fritted disc. The reactor tube is jacketed with a larger tube in which sand is fluidized for providing even heat distribution. The entire reactor assembly is placed in a controlled, hinged tube furnace. The reactant gases are premixed and heated to about 475° C. before entering the bottom of the reactor through a single inlet tube. The effluent gases from the reactor are heated to prevent condensation prior to chromatographic analysis.

EXAMPLE X

The unsupported antimony-uranium catalysts of Examples I through IX are used in the conversion of propylene and ammonia to acrylonitrile using the apparatus previously described. The particle size of the catalyst ranges from 74 to 250 microns in diameter. The weight of the catalyst used in each run is 30 grams. The feed materials are carried in helium. The reaction temperatures are 470 to 480° C. and the pressure employed is atmospheric. Other process data and the results are given in Table I.

TABLE I

| Catalyst | Example I | | | | Example II | | | Example III | | |
|---|---|---|---|---|---|---|---|---|---|---|
| Feed composition (volume percent): | | | | | | | | | | |
| Oxygen | 15.0 | 15.0 | 15.0 | 15.0 | 15.03 | 15.03 | 15.03 | 16.2 | 16.2 | 16.2 |
| Ammonia | 8.5 | 8.5 | 8.5 | 8.5 | 10.08 | 10.08 | 10.08 | 9.87 | 9.87 | 9.87 |
| Propylene | 7.4 | 7.4 | 7.4 | 7.4 | 8.92 | 8.92 | 8.92 | 8.67 | 8.67 | 8.67 |
| Contact time* (gm. sec./ml. at STP) | 10.0 | 10.0 | 10.0 | 10.0 | 10.0 | 10.0 | 10.0 | 9.9 | 9.9 | 9.9 |
| Elapsed reaction time (minutes) | 2 | 32 | 62 | 92 | 5 | 35 | 65 | 10 | 40 | 70 |
| Percent propylene converted | 95.4 | 90.0 | 88.2 | 87.2 | 92.0 | 90.9 | 91.7 | 94.4 | 95.0 | 94.8 |
| Percent selectivity to acrylonitrile | 67.6 | 77.4 | 80.0 | 81.0 | 87.6 | 86.3 | 86.7 | 84.2 | 83.9 | 83.9 |
| Percent propylene to acrylonitrile | 64.4 | 69.7 | 70.6 | 70.5 | 80.4 | 78.5 | 79.0 | 79.4 | 79.7 | 79.5 |
| HCN produced (volume percent) | 0.36 | 0.29 | 0.28 | 0.27 | 0.42 | 0.53 | 0.55 | 0.46 | 0.57 | 0.57 |

See footnotes at end of table.

TABLE I—Continued

| Catalyst | Example IV | | | Example V | | | | Example VI | | | |
|---|---|---|---|---|---|---|---|---|---|---|---|
| Feed composition (volume percent): | | | | | | | | | | | |
| Oxygen | 16.85 | 16.85 | 16.85 | 16.93 | 16.93 | 16.93 | 16.93 | 17.35 | 17.35 | 17.35 | 17.35 |
| Ammonia | 10.02 | 10.02 | 10.02 | 10.06 | 10.06 | 10.06 | 10.06 | 10.10 | 10.10 | 10.10 | 10.10 |
| Propylene | 8.68 | 8.68 | 8.68 | 8.72 | 8.72 | 8.72 | 8.72 | 8.85 | 8.85 | 8.85 | 8.85 |
| Contact time* (gm. sec./ml. at STP) | 9.9 | 9.9 | 9.9 | 15.1 | 15.1 | 15.1 | 15.1 | 15.1 | 15.1 | 15.1 | 15.1 |
| Elapsed reaction time (minutes) | 5 | 35 | 65 | 5 | 35 | 95 | 125 | Start | 30 | 60 | 90 |
| Percent propylene converted | 96.6 | 95.7 | 96.0 | 99.7 | 99.8 | 99.8 | 100. | 99.2 | 99.3 | 98.7 | 98.8 |
| Percent selectivity to acrylonitrile | 79.7 | 80.5 | 8.08 | 83.2 | 82.8 | 83.2 | 82.9 | 82.4 | 82.0 | 83.2 | 88.3 |
| Percent propylene to acrylonitrile | 76.8 | 77.1 | 77.6 | 82.8 | 82.7 | 82.9 | 82.9 | 81.8 | 81.4 | 82.2 | 82.2 |
| HCN produced (volume percent) | 0.27 | 0.48 | 0.48 | 0.27 | 0.32 | 0.27 | 0.27 | 0.37 | 0.32 | 0.26 | 0.23 |

| Catalyst | Example VII | | | Example VIII | | | | | Example IX | | | | | |
|---|---|---|---|---|---|---|---|---|---|---|---|---|---|---|
| | | | | Air calcined [1] | | | N₂ calcined [2] | | Air calcined [3] | | | N₂ calcined [4] | | |
| Feed composition (volume percent): | | | | | | | | | | | | | | |
| Oxygen | 16.73 | 16.73 | 16.73 | 16.95 | 16.95 | 16.95 | 16.95 | 16.95 | 16.97 | 16.97 | 16.97 | 17.12 | 17.12 | 17.12 |
| Ammonia | 9.87 | 9.87 | 9.87 | 9.55 | 9.55 | 9.55 | 9.55 | 9.55 | 9.88 | 9.88 | 9.88 | 9.88 | 9.88 | 9.88 |
| Propylene | 8.66 | 8.66 | 8.66 | 8.88 | 8.88 | 8.88 | 8.88 | 8.88 | 8.84 | 8.84 | 8.84 | 8.83 | 8.83 | 8.83 |
| Contact time* (gm. sec./ml. at STP) | 14.7 | 14.7 | 14.7 | 15.1 | 15.1 | 15.1 | 15.1 | 15.1 | 9.9 | 9.9 | 9.9 | 9.9 | 9.9 | 9.9 |
| Elapsed reaction time (minutes) | 10 | 70 | 130 | 10 | 40 | 70 | 5 | 25 | 5 | 35 | 95 | 5 | 35 | 65 |
| Percent propylene converted | 95.7 | 96.5 | 96.6 | 96.5 | 95.5 | 95.3 | 95.5 | 94.5 | 93.8 | 93.5 | 93.3 | 96.0 | 96.0 | 95.8 |
| Percent selectivity to acrylonitrile | 83.5 | 83.7 | 84.0 | 79.2 | 80.8 | 80.1 | 72.9 | 73.8 | 81.7 | 82.2 | 83.0 | 82.3 | 80.1 | 79.8 |
| Percent propylene to acrylonitrile | 79.9 | 80.8 | 81.2 | 76.5 | 76.3 | 76.2 | 69.6 | 69.7 | 76.5 | 76.8 | 77.4 | 79.0 | 76.8 | 76.4 |
| HCN produced (volume percent) | 0.31 | 0.31 | 0.31 | 0.27 | 0.25 | 0.23 | 0 | 0 | 0.58 | 0.67 | 0.64 | 0.21 | 0.24 | 0.27 |

[1] Surface area of 6.22 m.²/gm., 98% USb₃O₁₀ and 2% Sb₂O₅.
[2] Surface area of 4.97 m.²/gm., 95% USb₃O₁₀ and 5% Sb₂O₅.
[3] Surface area of 10 m.²/gm.
[4] Surface area of 5.96 m.²/gm.
*Contact time determined as:

$$\frac{\text{Weight of catalyst (grams)}}{\text{Flow rate (ml./min.) at STP}}$$

The above data clearly shows that the catalyst system prepared in accordance with this invention using air or nitrogen calcination exhibits activity, selectivity, and stability for converting propylene to acrylonitrile.

EXAMPLE XI

A catalyst is made in accordance with the procedure used in Example VIII and is calcined in air at various selected temperatures. XRD analysis of the resulting compositions are made. The criticality of the temperature used to calcine the catalyst to obtain predominantly a compound having the nominal formula of $USb_3O_{10}$ is indicated by the following analysis:

TABLE II

| Calcination temp., °C. | Catalyst components |
|---|---|
| 110 | $Sb_2O_5$. |
| 550 | $Sb_2O_5$. |
| 725 | $Sb_2O_5$. |
| 875 | 98 wt. percent $USb_3O_{10}$. |
|  | 2 wt. percent $Sb_2O_5$. |
| 950 | 99 wt. percent $USb_3O_{10}$. |
| 1000 | 100 wt. percent $USb_3O_{10}$. |
| 1100 | 25 wt. percent $USb_3O_{10}$. |
|  | 75 wt. percent $U_3Sb_3O_{15}$. |
| 1200 | 100 wt. percent $U_3O_8$. |

The predominantly crystalline substantially intermolecular compound characteristic of the 3:1 antimony-uranium catalyst of this invention is indicated by X-ray diffraction patterns obtained using a copper $K\alpha$ radiation source having a wave-length of 1.5418 A. and a Ni filter. Each sample analyzed having a size <44 microns is scanned from $2\theta$ at 5° to 110° at a rate of change of 1°/minute. The major X-ray diffraction lines and relative intensities are indicated in Table III.

TABLE III

| Line | d in A. | I/I₁ |
|---|---|---|
| 1 | 5.93 | 2 |
| 2 | 3.83 | 54 |
| 3 | 3.18 | 100 |
| 4 | 2.45 | 53 |
| 5 | 1.913 | 11 |
| 6 | 1.831 | 23 |
| 7 | 1.652 | 24 |
| 8 | 1.641 | 24 |
| 9 | 1.584 | 11 |
| 10 | 1.464 | 10 |
| 11 | 1.324 | 8 |
| 12 | 1.276 | 1 |

EXAMPLE XII

A catalyst is made in accordance with the procedure used in Example VIII and calcined in air at various selected temperatures. The paramagnetic susceptibilities of the resulting compositions are made by the Faraday method. Indicative results are given in the following table:

TABLE IV

| Calcination temp., °C. | Surface area, m.²/gm. | Bohr magnetons per mole U |
|---|---|---|
| 430 | 61.60 | 0.32 |
| 550 | 67.70 | 0.47 |
| 725 | 45.80 | 0.94 |
| 800 | 21.10 | 1.35 |
| 875 | 6.22 | 1.62 |
| 950 | 2.02 | 1.66 |

Theoretically, 1 unpaired electron per atom is equivalent to 1.73 Bohr magnetons per mole. Thus, the uranium is about 95% pentavalent uranium. Accordingly, the antimony has a valence of 5 when in the most active catalytic state, i.e., $USb_3O_{10}$.

EXAMPLE XIII

The unsupported antimony-uranium catalyst of Examples I, V, and VIII are used in the conversion of propylene to acrolein using the apparatus previously described. The particle size of the catalyst ranges from 74 to 250 microns in diameter. The weight of the catalyst used in each run is 3 grams. The feed materials are carried in helium. The reaction temperatures are about 500° C. and the pressure employed is atmospheric. Other process data and the results are given in Table V.

TABLE V

| | Examples | | | |
|---|---|---|---|---|
| | | | VIII | |
| | I | V | Air calcined [1] | N₂ calcined [2] |
| Feed composition (volume percent): | | | | |
| Oxygen | 11 | 11.1 | 11.0 | 11.0 |
| Propylene | 7 | 7.06 | 7.05 | 7.12 |
| Contact time* (gm. sec./ml. at STP) | .38 | .38 | .38 | .38 |
| Elapsed reaction time (minutes) | 42 | 45 | 45 | 61 |
| Percent propylene converted | 18.9 | 33.9 | 21.6 | 25.7 |
| Percent selectivity to acrolein | 80.6 | 82.2 | 87.8 | 81.3 |
| Percent propylene to acrolein | 15.2 | 27.9 | 18.9 | 20.9 |

[1] Surface area of 10 m²./gm.
[2] Surface area of 5.96 m²./gm.
*Contact time determined as:

$$\frac{\text{Weight of catalyst (grams)}}{\text{Flow rate (ml./min.) at STP}}$$

It will be obvious to persons skilled in the art that various modifications may be made in the improved catalyst and process as described in this application. Accordingly, it is intended that all such modifications which reasonably fall within the scope of the appended claims are a part hereof.

What is claimed is:

1. The method of making a catalyst containing a catalytic active compound of antimony, uranium and oxygen which comprises forming an acidic solution of antimony oxides and uranium salts or oxides, the atomic ratio of antimony to uranium being within the range of from about 1:1 to about 99:1, forming a solid residue from said acidic solution by heating the acidic solution to cause evaporation or by adding ammonium hydroxide to the acidic solution to cause precipitation, drying the resulting solid residue, and heating the solid residue at a temperature of from about 550° C. to about 1150° C. to form said active compound.

2. The method of making a catalyst consisting essentially of a compound represented by the formula $USb_3O_{10}$ by forming an acidic solution of antimony oxides and uranium salts or oxides, the atomic ratio of antimony to uranium being about 3:1, forming a solid residue from said acidic solution by heating the acidic solution to cause evaporation or by adding ammonium hydroxide to the acidic solution to cause precipitation, drying the resulting solid residue, and heating the dried solid residue at a temperature of from about 750° C. to about 1000° C. to form said compound.

3. The method of claim 2 wherein said solution is formed by oxidizing antimony metal with nitric acid, adding hydrochloric acid to dissolve said antimony oxides, and adding to said solution uranium oxide or a uranium salt which converts to the oxide.

References Cited

UNITED STATES PATENTS

| | | | |
|---|---|---|---|
| 3,198,750 | 8/1965 | Callahan et al. | 252—467 X |
| 3,408,401 | 10/1968 | Ball et al. | 252—467 X |
| 3,157,461 | 11/1964 | Gill et al. | 423—253 |

CARL D. QUARFORTH, Primary Examiner

R. L. TATE, Assistant Examiner

U.S. Cl. X.R.

252—301.1 R, 467